(12) United States Patent
Schaemann et al.

(10) Patent No.: US 10,250,144 B2
(45) Date of Patent: Apr. 2, 2019

(54) INPUT VOLTAGE DETECTION FOR A POWER CONVERTER INCLUDING A TRANSFORMER HAVING A PRIMARY SIDE AND A SECONDARY SIDE

(71) Applicant: Infineon Technologies Austria AG, Villach (AT)

(72) Inventors: Marcus Schaemann, Munich (DE); Robert Pizzuti, Rochester Hills, MI (US); Ali Fawaz, Dearborn, MI (US)

(73) Assignee: INFINEON TECHNOLOGIES AUSTRIA AG, Villach (AT)

( * ) Notice: Subject to any disclaimer, the term of this patent is extended or adjusted under 35 U.S.C. 154(b) by 175 days.

(21) Appl. No.: 14/794,639

(22) Filed: Jul. 8, 2015

(65) Prior Publication Data

US 2017/0012537 A1    Jan. 12, 2017

(51) Int. Cl.
*H02M 3/335* (2006.01)
*H02M 1/32* (2007.01)
*H02M 1/00* (2006.01)

(52) U.S. Cl.
CPC ......... *H02M 3/33507* (2013.01); *H02M 1/32* (2013.01); *H02M 3/33523* (2013.01); *H02M 2001/0009* (2013.01)

(58) Field of Classification Search
CPC .................................................. H02M 3/33507
USPC ............................. 363/21.12–21.18, 95, 97
See application file for complete search history.

(56) References Cited

U.S. PATENT DOCUMENTS

| | | | | |
|---|---|---|---|---|
| 5,969,962 A * | 10/1999 | Gabor | ................ | H02M 1/4225 363/81 |
| 8,710,765 B2 * | 4/2014 | Beland | ................ | H02M 1/4258 315/297 |
| 9,313,851 B2 * | 4/2016 | Fawaz | ................ | H05B 33/0812 |
| 2002/0085394 A1 * | 7/2002 | Giannopoulos | ... | H02M 3/33507 363/21.12 |
| 2004/0165403 A1 * | 8/2004 | Crawford | ............ | H02M 1/4208 363/17 |
| 2004/0257839 A1 * | 12/2004 | Yang | ................ | H02M 3/33507 363/21.12 |
| 2008/0192515 A1 | 8/2008 | Huynh et al. | | |
| 2008/0246456 A1 | 10/2008 | Djenguerian et al. | | |
| 2010/0026208 A1 * | 2/2010 | Shteynberg | ........ | H05B 33/0815 315/297 |
| 2011/0080111 A1 * | 4/2011 | Nuhfer | ............... | H05B 33/0815 315/291 |
| 2012/0153834 A1 * | 6/2012 | Moss | ................ | H05B 33/0815 315/122 |

(Continued)

FOREIGN PATENT DOCUMENTS

DE   202011052153 U1   3/2013

*Primary Examiner* — Adolf Berhane
*Assistant Examiner* — Nusrat Quddus
(74) *Attorney, Agent, or Firm* — Slater Matsil, LLP

(57) ABSTRACT

An example relates to a method for operating a converter comprising a primary side of a transformer and a secondary side of the transformer, wherein a switching element is used for conveying energy from the primary side to the secondary side, the method comprising (i) determining a voltage drop across the primary side of the transformer; (ii) determining at least one additional voltage drop across at least one component of the converter's primary side; and (iii) determining an input voltage at the converter via the voltage drops.

18 Claims, 1 Drawing Sheet

(56) References Cited

U.S. PATENT DOCUMENTS

| | | | |
|---|---|---|---|
| 2012/0319588 A1* | 12/2012 | Sid | H05B 41/2855 |
| | | | 315/129 |
| 2014/0145637 A1* | 5/2014 | Goscha | H01J 65/048 |
| | | | 315/248 |
| 2014/0293660 A1* | 10/2014 | Teo | H02M 3/33507 |
| | | | 363/21.17 |
| 2015/0155786 A1* | 6/2015 | Shen | H02M 1/32 |
| | | | 363/15 |
| 2015/0155787 A1 | 6/2015 | Chen | |
| 2015/0244272 A1* | 8/2015 | Schaemann | H02M 3/33523 |
| | | | 363/21.18 |
| 2015/0311803 A1* | 10/2015 | Schaemann | H02M 1/4258 |
| | | | 315/210 |
| 2016/0261199 A1* | 9/2016 | Adragna | H02M 3/33523 |
| 2016/0276936 A1* | 9/2016 | Gritti | H02M 1/4258 |
| 2016/0336861 A1* | 11/2016 | Gritti | H02M 3/33523 |
| 2016/0358705 A1* | 12/2016 | Lin | H01F 27/06 |
| 2016/0359421 A1* | 12/2016 | Lin | H02M 3/33592 |

* cited by examiner

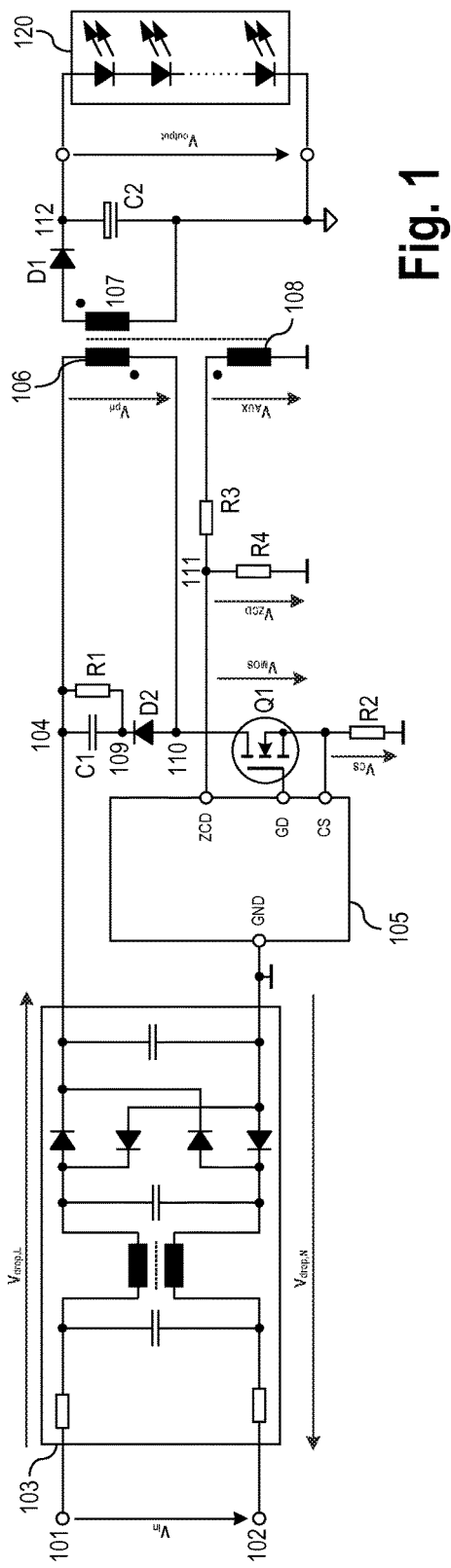
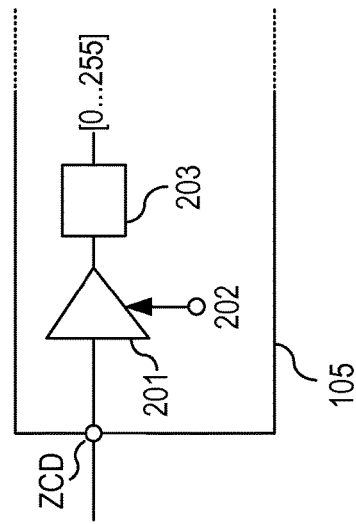
Fig. 1
Fig. 2

US 10,250,144 B2

INPUT VOLTAGE DETECTION FOR A POWER CONVERTER INCLUDING A TRANSFORMER HAVING A PRIMARY SIDE AND A SECONDARY SIDE

TECHNICAL FIELD

Embodiments of the present invention relate to input voltage detection for a converter.

SUMMARY

Embodiments of the present invention relate to input voltage detection for a converter, e.g., a flyback converter. In particular, an accuracy of the input voltage detection is improved in comparison to known solutions.

A first embodiment relates to a method for operating a converter comprising a primary side of a transformer and a secondary side of the transformer. A switching element is used for conveying energy from the primary side to the secondary side. A voltage drop across the primary side of the transformer is determined. At least one additional voltage drop across at least one component of the converter's primary side is determined. An input voltage at the converter is determined via the voltage drops.

A second embodiment relates to a device that includes a transformer and a switching element for conveying energy from a primary side of the transformer to a secondary side of the transformer. A control unit that is arranged for determining a voltage drop across the primary side of the transformer, determining at least one additional voltage drop across at least one component at the primary side, and determining an input voltage based on the voltage drops.

A third embodiment relates to a device for providing electrical power to a load. The device comprises a transformer, a switching element for conveying energy from a primary side of the transformer to a secondary side of the transformer. The device also comprises means for determining a voltage drop across the primary side of the transformer, means for determining at least one additional voltage drop across at least one component at the primary side, and means for determining an input voltage via the voltage drops.

A fourth embodiment is directed to a computer program product directly loadable into a memory of a digital processing device, comprising software code portions for performing the steps of the method described herein.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

FIG. 1 shows a schematic circuitry of an exemplary flyback converter; and

FIG. 2 shows the PWM control of FIG. 1 with its ZCD terminal, which is connected to an amplifier, wherein a gain of the amplifier can be adjusted and the output of this amplifier is fed to an ADC that provides a digital signal of the predefined resolution.

DETAILED DESCRIPTION OF ILLUSTRATIVE EMBODIMENTS

A control unit for a power supply usually requires measurement of the power supply's input voltage. The power supply may be a switching power supply comprising a converter with at least one electronic switching element, e.g., transistor, which is controlled by the control unit, e.g., a PWM control (PWM: pulse width modulation). The control unit may be used to convey electronic energy from a primary side to a secondary side of a transformer, wherein the switch may be arranged on the primary side. The converter may comprise a buck converter and/or a boost converter. The power supply may be used for dimming purposes with regard to lighting applications. However, examples presented herein may also be used in combination with (power) converters of any kind.

The information about the input voltage may be used for various control purposes, e.g., for regulation and detection of over- or under-voltage. The accuracy of such measurement has a direct impact on the performance of the system and the accuracy of, e.g., brown-out thresholds.

A switched-mode power supply does not merely draw a constant current from the input, but instead draws the current in a pulsed manner. Thus, the peak input current can be much higher than an average input current. Due to inductors in the input filter the rectified input voltage can also be higher than the actual input voltage.

Depending on an input filter design and/or a resistance of a cable, there may be a significant voltage drop caused by high currents or voltage boosts caused by the input filter inductor. The voltage that is measured at a primary winding (after the resistance of the input filter and cable) of the transformer does hence not reflect the input voltage correctly.

In an example, the measured input voltage (e.g., by using the primary winding voltage) may be combined with a measured current to compensate voltage changes that result from resistances and inductors along the system, e.g., across the input filter, cables, shunt resistor(s) and switching element(s). This makes the input voltage measurement more accurate and allows sensing of, e.g., a brown-out threshold (more) independently from operation conditions.

FIG. 1 shows a schematic circuitry of a flyback converter comprising a n-channel MOSFET Q1 as an exemplary electronic switch and a PWM control 105 comprising a zero crossing detection, a PWM generator and a current sense unit. The zero crossing detection receives a signal via a terminal ZCD, the PWM generator controls the gate of the MOSFET Q1 via a terminal GD (gate driver) and the current sensing unit receives a signal via a terminal CS.

Also, a transformer is provided comprising a primary winding 106, a secondary winding 107 and an auxiliary winding 108. It is noted that the primary winding 106, the secondary winding 107 and the auxiliary winding 108 may each comprise one or several windings. There may be a predetermined ratio of turns between the primary winding 106 and the auxiliary winding 108 such that a faction of the voltage across the primary loop 106 can be detected across the auxiliary winding 108.

An AC input voltage $V_{in}$, (e.g., 85 VAC to 305 VAC) can be connected to terminals 101 and 102. The AC input signal $V_{in}$, is then processed by a rectifier 103 (which may comprise an input filter) and a DC signal output by the rectifier 103 is conveyed to a node 104. The node 104 is connected via a capacitor C1 to a node 109 and the node 109 is connected via a diode D2 to a node 110. The cathode of the diode D2 is directed towards the node 109. A resistor R1 is arranged in parallel to the capacitor C1. The primary winding 106 is connected between the nodes 104 and 110.

The node 110 is connected to the drain of the MOSFET Q1. The source of the MOSFET Q1 is connected via a resistor R2 to ground. The source of the MOSFET Q1 is also connected to the terminal CS. The terminal GD is connected to the gate of the MOSFET Q1.

The auxiliary winding 108 supplies an auxiliary voltage $V_{AUX}$. One pin of the auxiliary winding 108 is connected to ground, the other pin is connected via a resistor R3 to a node 111. The node 111 is connected to the terminal ZCD of the PWM control 105. The node 111 is further connected via a resistor R4 to ground. Hence, the auxiliary winding, via the resistors R3 and R4, supplies the zero crossing signal to the terminal ZCD of the PWM control 105.

One pin of the secondary winding 107 is connected via a diode D1 to a node 112, wherein the cathode of the diode D1 points toward the node 112. The other pin of the secondary winding 107 is connected to ground of the secondary side (as the primary side) and the secondary side may be galvanically separated from each other, the ground of the primary side may be different from the ground of the secondary side; in other words, the ground of the primary side may not be connected to the ground of the secondary side.

A capacitor C2 is connected across the secondary winding 107. An output voltage $V_{output}$ is supplied across the node 112 and the ground (of the secondary side). In the example shown in FIG. 1, a load 120 may be supplied by the output voltage; such load 120 may comprise a series connection of light emitting diodes (LEDs).

A primary voltage $V_{pri}$ drops across the primary winding 106 (i.e. between the nodes 104 and 110). A zero-crossing voltage $V_{ZCD}$ can be determined across the resistor R4, i.e. between the node 111 and ground. A voltage $V_{MOS}$ drops across the MOSFET Q1, i.e. between the drain and source of the MOSFET Q1. A current sense voltage $V_{CS}$ drops across the resistor R2. Between the terminal 101 and the node 104 drops a voltage $V_{drop,L}$ and between the ground and the terminal 102 drops a voltage $V_{drop,N}$.

Hence, the voltage $V_{pri}$ at the primary windings 106 can be measured by considering the voltage across the auxiliary winding 108. During the time the power MOSFET Q1 is switched on, the auxiliary winding 108 reflects the voltage $V_{pri}$ across the primary winding 106 to the auxiliary winding 108: Depending on the winding directions, this can either be sensed directly using a voltage divider (in case of a positive voltage $V_{AUX}$) or indirectly over a clamp current which clamps the pin ZCD to a defined voltage (in case of a negative voltage $V_{AUX}$). As a result, the voltage $V_{pri}$ over the primary winding 106 can be measured using the predefined fixed turns ratio between primary winding and auxiliary winding.

To obtain a more accurate measurement of the input voltage $V_{in}$, the following voltage drops may also be considered:

the voltage drops $V_{drop,L}$ and $V_{drop,N}$ across cable, input filter and rectifier 103 (having a resistance $R_{in,L}$ and $R_{in,N}$);

the voltage drop $V_{MOS}$ across the MOSFET Q1 (with an resistance amounting to $R_{DSon}$);

the voltage drop $V_{CS}$ across sense resistor R2;

any voltage drops across electro-magnetic interference filters.

In order to combine the current and resistance information, the primary winding voltage $V_{pri}$ and the voltage $V_{CS}$ (for the current) may be measured at the same time, e.g., just before the MOSFET Q1 is switched off. However, the measurement may take place at any time during the on-time of the MOSFET.

The voltage $V_{pri}$ is preferably determined via the voltage $V_{AUX}$ also considering the turns ratio between the primary winding and the auxiliary winding.

As a result, the voltage $V_{CS}$ can be used to compensate any voltage drops and make the input voltage measurement more accurate:

$$V_{in}=V_{drop,L}+V_{pri}+V_{MOS}+V_{CS}+V_{drop,N}$$

$$V_{in}=V_{pri}+V_{CS}*(R_{in,L}+R_{DSon}+R2+R_{in,N})/R2$$

The resistance values $R_{in,L}$ and $R_{in,N}$ of the cable and rectifier 103 (which may include a filter) may be determined in advance or they may be estimated. The resistance $R_{DSon}$ of the MOSFET Q1 may be obtained from its data sheet and the value of the resistor R2 is known. Hence, the input voltage $V_{in}$ can be determined with a higher accuracy considering also the input current (voltage across resistors that are affected by the input current).

As an option, the resistor divider comprising the resistors R3 and R4 and transformer turns ratio of the primary winding 106 and the auxiliary winding 108 may be designed to allow a measurement of an input voltage up to a predefined maximum. The PWM control 105 may process the signal delivered to the ZCD pin by an analog-digital-converter (ADC), which results in a digital signal of a predefined resolution, e.g., 8-bit. This limited sampling resolution limits an accuracy of measuring low output voltages. In order to increase the range, an adaptive gain of the ZCD sampling can be provided.

FIG. 2 shows the ZCD terminal of the PWM control 105, which is connected to an amplifier 201, wherein a gain of the amplifier 201 can be adjusted via a signal 202. The output of the amplifier 201 is fed to an ADC 203 that provides a digital signal of the predefined resolution, e.g., 8-bit. The dynamic adaptation of the gain allows amplifying high ZCD voltages using a low gain and low ZCD voltages using a high gain. The result is an improved granularity for measuring low voltages.

Hence, the solution presented enhances the accuracy of the measurement of the primary voltage $V_{pri}$ and is also capable of considering at additional elements (as discussed above).

Advantageously, the range switching of the ZCD may be extended by an additional compensation of voltage drops also using the measured input current.

The examples suggested herein may in particular be based on at least one of the following solutions. In particular combinations of the following features could be utilized in order to reach a desired result. The features of the method could be combined with any feature(s) of the device, apparatus or system or vice versa.

A method is provided for operating a converter comprising a primary side of a transformer and a secondary side of the transformer, wherein a switching element is used for conveying energy from the primary side to the secondary side, the method comprising determining a voltage drop across the primary side of the transformer;

determining at least one additional voltage drop across at least one component of the converter's primary side;

determining an input voltage at the converter via the voltage drops.

Hence, a (peak) current can be detected via voltage drops across components of the converter. Hence, the measured input voltage (e.g., by using the primary winding voltage) may be combined with the measured current to compensate voltage drops that result from resistances along the system, e.g., across the input filter, cables, shunt resistor(s) and switching element(s). This makes the input voltage measurement more accurate and allows sensing of, e.g., a brown-out threshold (more) independently from operating conditions.

It is one advantage that the input voltage may be determined based on various output load conditions. Hence, an electro-magnetic interference filter impedance that depends on the input current may be compensated so that thresholds may fit in various modes.

In an embodiment, the input voltage is used to determine an input voltage drop below a predetermined threshold.

In an embodiment, the converter is a flyback converter.

It is noted that the examples presented may be applied, but are not limited to flyback converters. For example, the approach described herein may also be used with regard to, e.g., buck-converter, boost-converter or any other converter topology.

In an embodiment, the method further comprises:
determining the voltage drop across the primary side of the transformer via a voltage drop across an auxiliary winding of the transformer.

In an embodiment, the additional voltage drop across at least one component of the converter's primary side comprises at least one of the following:
a voltage drop across a rectifier of the converter;
a voltage drop across an input filter of the converter;
a voltage drop across a rectifier;
a voltage drop across a sense resistor;
a voltage drop across the switching element;
a voltage drop across a cable;
a voltage drop across a connection.

In an embodiment, the method further comprises:
determining, when the switching element is switched on, the input voltage based on the voltage drop across the primary side of the transformer via a voltage drop across an auxiliary winding of the transformer,
the voltage drop across a sense resistor,
the sense resistor,
the resistance of the switching element.

In an embodiment, the method comprises determining the input voltage as follows:

$$V_{in} = V_{pri} + V_{CS} * (R_{DSon} + R2)/R2$$

wherein
$V_{in}$ is the input voltage,
$V_{pri}$ is the voltage at the primary side of the transformer,
$V_{CS}$ is the voltage drop across the sense resistor,
R2 is the sense resistor,
$R_{DSon}$ is the resistance of the switching element.

In an embodiment, the method comprises determining the input voltage as follows:

$$V_{in} = V_{pri} + V_{CS} * (R_{rf} + R_{DSon} + R2)/R2$$

wherein
$V_{in}$ is the input voltage,
$V_{pri}$ is the voltage at the primary side of the transformer,
$V_{CS}$ is the voltage drop across the sense resistor,
R2 is the sense resistor,
$R_{DSon}$ is the resistance of the switching element,
$R_{rf}$ is the resistance of a rectifier, filter and cables connected.

In an embodiment, the switching element comprises at least one of the following: a transistor, a bipolar transistor, a MOSFET, a JFET, an IGBT.

In an embodiment, the respective voltage drop is determined based on the resistance value of the respective component.

In an embodiment, the input voltage is used to drive the switching element.

Hence, the input voltage determined can be used for driving the switching element, e.g., a gate of a MOSFET.

In an embodiment, the method further comprises:
converting the input voltage to a digital signal;
adjusting a gain level of the input voltage before converting it to the digital signal.

A device is suggested, said device comprising:
a transformer,
a switching element for conveying energy from a primary side of the transformer to a secondary side of the transformer,
a control unit that is arranged for
determining a voltage drop across the primary side of the transformer;
determining at least one additional voltage drop across at least one component at the primary side;
determining an input voltage based on the voltage drops.

In an embodiment, the device is a converter, in particular a flyback converter.

In an embodiment, the transformer comprises an auxiliary winding and wherein the voltage drop across the primary side of the transformer is determined via a voltage drop across the auxiliary winding.

In an embodiment, the component is at least one of the following:
a rectifier of the converter;
an input filter of the converter;
a rectifier;
a sense resistor;
the switching element;
across a cable;
a connection.

In an embodiment, the respective voltage drop is determined based on the resistance value of the respective component.

In an embodiment, the device further comprises:
an amplifier for adjusting a gain level of the input voltage,
an analog-to-digital-converter, which is connected to the amplifier,
wherein the analog-to-digital converter is arranged for converting the adjusted input voltage into a digital signal.

In an embodiment, the device is used to drive a load, in particular a lighting device. The lighting device may in particular comprise a semiconducting light emitter, e.g., laser diode or light emitting diode.

In an embodiment, the device is a power supply, in particular part of a power supply to operate a load.

In an embodiment, the device is a battery charger.

Further, a device is suggested for providing electrical power to a load, said device comprising a transformer, a switching element for conveying energy from a primary side of the transformer to a secondary side of the transformer, and
means for determining a voltage drop across the primary side of the transformer;
means for determining at least one additional voltage drop across at least one component at the primary side;
means for determining an input voltage via the voltage drops.

Also, a computer program product is suggested, which is directly loadable into a memory of a digital processing device, comprising software code portions for performing the steps of the method as described herein.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, power adapters, battery chargers, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

What is claimed is:

1. A method for operating a converter comprising:
    determining a first voltage drop across a primary side of a transformer with the primary side and a secondary side, the transformer also comprising a switching element that is used to convey energy from the primary side to the secondary side;
    determining a second voltage drop across at least one component of the converter's primary side; and
    when the switching element is switched on, determining an input voltage at the converter based on the first and second voltage drops, the input voltage being determined based on:
        the first voltage drop across the primary side of the transformer, the first voltage drop being determined by a voltage drop across an auxiliary winding of the transformer;
        the second voltage drop being determined across a sense resistor,
    wherein determining the input voltage comprises using the formula $$Vin = Vpri + VCS*(RDSon+R2)/R2,$$

wherein
    Vin is the input voltage,
    Vpri is the voltage at the primary side of the transformer,
    VCS is the voltage drop across the sense resistor,
    R2 is the sense resistor, and
    RDSon is the resistance of the switching element.

2. The method according to claim 1, wherein the input voltage is used to determine an input voltage drop below a predetermined threshold.

3. The method according to claim 1, wherein the converter is a flyback converter.

4. The method according to claim 1, wherein the switching element comprises a transistor, a bipolar transistor, a MOSFET, a JFET, or an IGBT.

5. The method according to claim 1, wherein the first voltage drop is determined based on a resistance value of the primary side of the transformer and wherein the second voltage drop is determined based on a resistance value of the at least one component.

6. The method according to claim 1, further comprising using the input voltage to drive the switching element.

7. The method according to claim 1, further comprising:
converting the input voltage to a digital signal; and
adjusting a gain level of the input voltage before converting it to the digital signal.

8. A non-transitory computer program product directly loadable into a memory of a digital processing device, comprising software code portions for performing the steps of the method according to claim 1.

9. A device comprising:
a transformer,
a switching element coupled to convey energy from a primary side of the transformer to a secondary side of the transformer;
a control unit that is arranged for
determining a first voltage drop across the primary side of the transformer;
determining a second voltage drop across at least one component at the primary side; and
when the switching element is switched on, determining an input voltage based on the first and second voltage drops, the input voltage being determined based on:
the first voltage drop across the primary side of the transformer, the first voltage drop being determined by a voltage drop across an auxiliary winding of the transformer;
the second voltage drop being determined across a sense resistor,
wherein determining the input voltage comprises using the formula $$Vin = Vpri + VCS*(Rrf + RDSon + R2)/R2,$$

wherein
Vin is the input voltage,
Vpri is the voltage at the primary side of the transformer,
VCS is the voltage drop across the sense resistor,
R2 is the sense resistor,
RDSon is the resistance of the switching element; and
Rrf is an additional resistance associated with the device.

10. The device according to claim 9, wherein the device is a flyback converter.

11. The device according to claim 9, wherein the transformer comprises an auxiliary winding and wherein the first voltage drop is determined based on a voltage drop across the auxiliary winding.

12. The device according to claim 9, wherein the at least one component comprises:
a filter;
a rectifier;
a sense resistor;
the switching element;
a cable; or
a connection.

13. The device according to claim 9, wherein the first voltage drop is determined based on a resistance value of the primary side of the transformer and wherein the second voltage drop is determined based on a resistance value of the at least one component.

14. The device according to claim 9, further comprising:
an amplifier coupled to adjust a gain level of the input voltage; and
an analog-to-digital-converter coupled to an output of the amplifier.

15. The device according to claim 9, wherein the device is used to drive a lighting device.

16. The device according to claim 9, wherein the device comprises part of a power supply to operate a load.

17. The device according to claim 9, wherein the device is a battery charger.

18. A device for providing electrical power to a load, the device comprising:
a transformer;
a switching element for conveying energy from a primary side of the transformer to a secondary side of the transformer;
means for determining a voltage drop across the primary side of the transformer;
means for determining at least one additional voltage drop across at least one component at the primary side; and
means for determining an input voltage via the voltage drop and the at least one additional voltage drop when the switching element is switched on, the input voltage being determined based on:
the voltage drop across the primary side of the transformer, the voltage drop being determined by a voltage drop across an auxiliary winding of the transformer;
the at least one additional voltage drop being determined across a sense resistor,
wherein determining the input voltage comprises summing the voltage at the primary side of the transformer and the voltage across the sense resistor modified by the voltage across the switching element.

* * * * *